(12) United States Patent
Soubeyrand et al.

(10) Patent No.: US 9,957,194 B2
(45) Date of Patent: May 1, 2018

(54) COATED TINTED GLASS ARTICLE AND METHOD OF MAKING SAME

(75) Inventors: Michel J. Soubeyrand, Holland, OH (US); Srikanth Varanasi, Ottawa Hills, OH (US)

(73) Assignee: Pilkington Group Limited, Lathom (GB)

( * ) Notice: Subject to any disclaimer, the term of this patent is extended or adjusted under 35 U.S.C. 154(b) by 658 days.

(21) Appl. No.: 13/261,737

(22) PCT Filed: Mar. 15, 2012

(86) PCT No.: PCT/US2012/029143
§ 371 (c)(1),
(2), (4) Date: Oct. 16, 2013

(87) PCT Pub. No.: WO2012/134821
PCT Pub. Date: Oct. 4, 2012

(65) Prior Publication Data
US 2014/0037925 A1  Feb. 6, 2014

Related U.S. Application Data

(60) Provisional application No. 61/469,150, filed on Mar. 30, 2011.

(51) Int. Cl.
*C03C 17/34* (2006.01)
*C03C 17/00* (2006.01)
*F24J 2/48* (2006.01)

(52) U.S. Cl.
CPC ........ *C03C 17/3417* (2013.01); *C03C 17/002* (2013.01); *C03C 2218/1525* (2013.01); *F24J 2/485* (2013.01); *Y10T 428/24975* (2015.01); *Y10T 428/265* (2015.01)

(58) Field of Classification Search
CPC .............. C03C 17/002; C03C 17/3417; C03C 2218/1525; F24J 2/485; Y10T 428/265; Y10T 428/24975
USPC .................. 428/216, 336, 426, 432; 65/60.2
See application file for complete search history.

(56) References Cited

U.S. PATENT DOCUMENTS

| | | |
|---|---|---|
| 4,187,336 A | 2/1980 | Gordon |
| 4,206,252 A | 6/1980 | Gordon |
| 4,419,386 A | 12/1983 | Gordon |
| 5,780,149 A | 7/1998 | McCurdy et al. |

(Continued)

FOREIGN PATENT DOCUMENTS

| | | |
|---|---|---|
| EP | 0983972 A2 | 3/2000 |
| WO | 98/10922 A1 | 3/1998 |
| WO | 01/10790 A1 | 2/2001 |

OTHER PUBLICATIONS

Database WPI; Coated glass article used for producing coated, heat reducing glass unit for architectural windows, includes a glass substrate, and coatings of antimony doped tin oxide and fluorine doped tin oxide; XP002686287; Week 200115; Thomson Scientific, London, GB.

*Primary Examiner* — Brian Handville
(74) *Attorney, Agent, or Firm* — Marshall & Melhorn, LLC

(57) ABSTRACT

The invention relates to a multi-layer pyrolytic coating stack deposited on a tinted glass substrate to form a coated glass article exhibiting a desired combination of emissivity, visible light transmittance and solar heat gain coefficient. A method for depositing the multi-layer coating stack on the tinted glass substrate is also part of the invention.

15 Claims, 1 Drawing Sheet

(56) References Cited

U.S. PATENT DOCUMENTS

| | | |
|---|---|---|
| 6,218,018 B1 | 4/2001 | McKown et al. |
| 6,858,306 B1 | 2/2005 | Strickler et al. |
| 7,625,830 B2 * | 12/2009 | Shelestak .................. C03C 4/02 501/64 |
| 2003/0215648 A1 | 11/2003 | Varanasi |
| 2007/0281168 A1 | 12/2007 | Varanasi |

* cited by examiner

COATED TINTED GLASS ARTICLE AND METHOD OF MAKING SAME

RELATED APPLICATION

This application is claiming the benefit, under 35 U.S.C. 119(e), of the provisional application filed Mar. 30, 2011 under 35 U.S.C. 111(b), which was granted Ser. No. 61/469,150. This provisional application is hereby incorporated herein by reference, in its entirety.

BACKGROUND

The invention relates to a coating on a glass substrate and a method of depositing the coating on the glass substrate. More particularly, the invention relates to a multi-layer pyrolytic coating stack deposited on a tinted glass substrate to form a coated glass article exhibiting a combination of desired properties, and method of depositing the multi-layer coating stack during the glass manufacturing process.

Forming a thin film coating on a glass substrate by one of several known methods is well known. Utilizing coatings on tinted glass substrates is also known. Those skilled in the art will, however, appreciate that the combinations of different coatings and substrates to accomplish different desired appearance and performance objectives for such coated substrates is virtually limitless.

One such set of appearance/performance objectives for coated glass substrates includes high visible light transmittance, color neutrality in glass side and film side reflectance and low solar radiation transmittance. Those skilled in the art continue to search for new and cost effective ways to achieve this difficult combination of appearance/performance objectives.

SUMMARY OF THE INVENTION

The invention relates to a coating on a glass substrate and a method of depositing the coating on the glass substrate. More particularly, the invention relates to a multi-layer pyrolytic coating stack deposited on a tinted glass substrate to form a coated glass article exhibiting a combination of desired properties, and a method of depositing the multi-layer coating stack during the glass manufacturing process.

The coated glass article of the invention includes a tinted glass substrate upon which a multi-layer coating stack is deposited. To achieve color neutrality of glass side and film side reflectance, a color suppression coating is preferably deposited on the tinted glass substrate. Deposition of a doped tin oxide coating over the color suppression coating and a silica overcoat over the doped tin oxide coating have surprisingly been found to create a coated glass article having, in combination, a hemispherical emissivity <0.4, a visible light transmittance >70% and a solar heat gain coefficient ≤0.55.

The coatings described above are preferably formed during a float glass manufacturing process by a chemical vapor deposition method, particularly by atmospheric pressure chemical vapor deposition (APCVD).

DETAILED DESCRIPTION OF THE INVENTION

Figure 1:
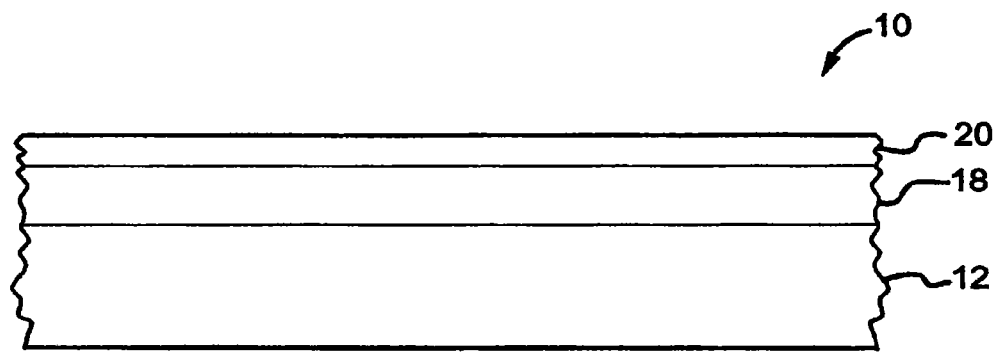
FIG. 1 shows a schematic representation of a film stack according to the invention.
Figure 2:
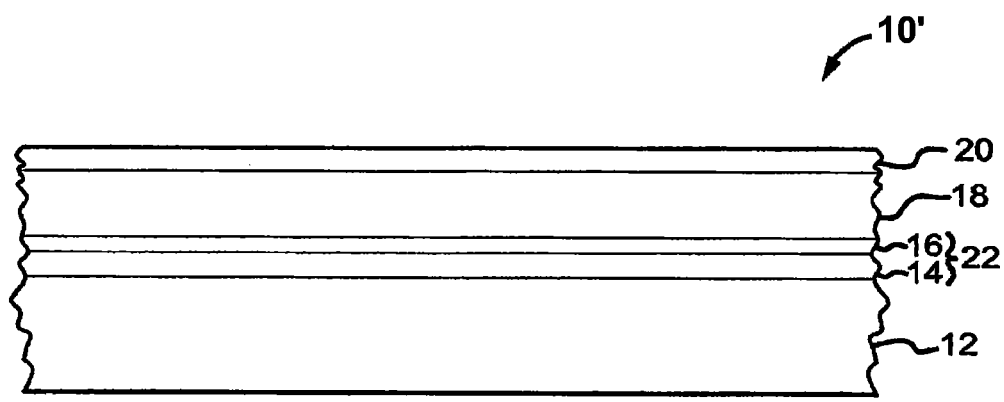
FIG. 2 shows a schematic representation of a film stack with optional color suppression coating according to a preferred configuration of the invention.

The invention relates to a coating on a glass substrate and a method of depositing the coating on the glass substrate. More particularly, the invention relates to a multi-layer pyrolytic coating stack deposited on a tinted glass substrate to form a coated glass article exhibiting a combination of desired properties, and a method of depositing the multi-layer coating stack during the glass manufacturing process.

In accordance with the invention, it has been discovered that a coated glass article having a multi-layer coating including a doped tin oxide coating, a silica overcoat and optionally, an iridescence-suppressing or reflected color suppressing coating deposited on a tinted glass substrate exhibits a surprising combination of relatively low hemispherical emissivity, relatively high visible light transmittance and low solar heat gain coefficient. This combination of properties renders the coated glass article suitable for use as, for example, architectural windows and vehicle windows. The invention is thought to have particular application for windows in non-road going vehicles, for example, construction and agricultural equipment.

Glass substrates 12 suitable for use in preparing the coated glass article 10, 10' according to the invention, may include any of the tinted glass compositions known in the art as useful for architectural or vehicle windows. The preferred substrate 12 is a body tinted (i.e. the tint or color is a result of one or more chemical constituents of the glass composition) glass formed by the well known float glass process. While other tinted glasses are possible, preferred tints for glasses according to the invention are green, blue and blue green. More specifically, glasses according to the invention fall within the CIELAB color coordinate range, as measured by Illuminant C, $a^*=-10.5$ to $-4$ and $b^*=-6.5$ to $+4$. Preferably, the glasses of the invention fall within the CIELAB color coordinate range, as measured by Illuminant C, $a^*=-8.8$ to $-5.5$ and $b^*=-3$ to $+2$. Preferably, the coatings of the invention are deposited in the float bath portion of the float glass process. Tinted substrates may be selected to impart specific spectral properties to the coated glass article.

Preferably, the color suppressing coating 22 of the invention provides a means to reflect and refract light so as to interfere with the observance of undesirable iridescence from the coated glass article 10'. Such color suppressing coatings 22 are well known in the art, for example, from U.S. Pat. Nos. 4,187,336, 4,419,386 and 4,206,252, herein incorporated by reference. The color suppression coating 22 of the invention may be a single color suppressing coating, a multi-layer coating or a gradient coating. A multi-layer color suppressing coating is preferred. A multi-layer color suppressing coating 22 comprising a first tin oxide coating 14 and a second silica coating 16 is most preferred. The thickness of each of the first and second coatings 14, 16 is typically in the range of 20 nm-30 nm.

The doped tin oxide layer 18 may be doped with any suitable dopant, however, a fluorine compound is preferred as a dopant. The doping of the tin oxide contributes to a low emissivity value, in the case of the invention herein, <0.4, preferably <0.3. The thickness of the doped tin oxide coating 18 is preferably <350 nm.

The silica overcoat layer 20 may be made from any suitable silica precursor material, however, a silane precursor material is preferred. The thickness of the silica overcoat layer 20 may have a thickness of 30 nm-90 nm, and advantageously has a thickness in the range of 30 nm-50 nm.

The doped tin oxide 18 and silica overcoat 20 coatings having relatively high and relatively low refractive indices, respectively, together reduce light reflection and increase transmittance of visible light of the coated glass article 10, 10' of the invention. Additionally, the low emissivity of the coating stack minimizes the solar heat gain from absorption of solar radiation. This can be quantitatively expressed as the solar heat gain coefficient (SHGC), which is conventionally defined as the ratio of the total solar heat gain through the glass relative to the incident solar radiation. Solar heat gain includes both the solar energy transmitted through the glass, plus the solar energy absorbed by the glass and subsequently convected and thermally radiated inward. Emissivity can be defined as: the relative ability of the surface of a material to emit energy by radiation, or put another way, it is the ratio of energy radiated by a particular material to energy radiated by a black body at the standard temperature, i.e. 25 C. Hemispherical emissivity is the radiation emitted in all directions over a hemisphere.

Such properties are advantageous if a window made according to the invention is installed in, for example, the cab of an agricultural tractor, which has a relatively large area so as to provide good outward vision, but encloses a relatively small volume of interior space that would heat up quickly if preventive measures were not taken. Due to the nature of the rigorous use to which a tractor may be put, it is worth noting that the glass thickness for such a window may be on the order of 5-6 mm, preferably 6 mm. Such a glass thickness increases the difficulty of achieving the balance of properties in fact exhibited by the present invention. In order to be acceptable for such uses, the window of the invention must meet the requirements of Automotive Standard SAE J 1796-Illuminant A (10 degree observer). The requirements of this standard include Tvis>70%.

Applicant's long experience in the field of solar control glass products also indicates that a relatively low solar heat gain coefficient, i.e. ≤0.55, is highly advantageous in providing the expected degree of occupant comfort in the vehicle cabin. In a preferred configuration, the coated glass article of the invention comprises:

Glass/SnO2 (25 nm)/SiO2 (25 nm)/SnO2:F (250 nm)/SiO2 (about 40 nm).

In such a configuration, the coated glass article 10 has been found to exhibit a visible light transmittance (Tvis) >70%, a SHGC<55 and a hemispherical emissivity (Eh) <0.3.

The coated tinted glass article 10 of the invention may also be useful for applications which are not required to meet the Tvis requirement of, for example, Automotive Standard SAE J 1796. Such applications may include architectural windows, preferably comprising monolithic sheets or panes of coated tinted glass.

The Examples and Comparative Examples in Table 1 resulted from on-line experiments conducted at assignee's float glass manufacturing facility in Laurinburg, N.C. The Predictive Examples resulted from computer modeling conducted by applicants.

For the on-line experiments, a commercially available blue-green glass product was being produced, generally under typical float glass conditions, as described in more detail elsewhere in this application. As such, the temperature of the float glass ribbon was at a temperature between 1050° F. (565° C.) and 1200° F. (650° C.). The non-oxidizing float bath atmosphere was substantially atmospheric pressure. Multiple coating apparatus were utilized to deposit the various layers of the coating stack comprising the coated glass article.

Precursor flow rates were as follows:

| | |
|---|---|
| Undoped dimethyltin dichloride (DMT) | −2.8 slm |
| Silane interlayer | −1.4 slm |
| Fluorine doped DMT | −24.0 slm |
| Silane (overcoat) | −7.0 slm |

The examples, compiled in Table 1, constitute the best mode currently contemplated by the inventor for practicing the invention, and are presented solely for the purpose of further illustrating and disclosing the present invention, and are not to be construed as a limitation on the invention:

TABLE 1

| Glass tint/Thickness | Color Suppression | SnO2:F | SiO2 | Tvis (%) | Rf (%) | Eh | SHGC |
|---|---|---|---|---|---|---|---|
| Comparative Ex | | | | | | | |
| C1 BG (5 mm)2/10 | — | — | — | 75.6 | 7.2 | 0.840 | 0.66 |
| C2 BG (5 mm) | SnO₂ (25 mm)/SiO₂ (25 mm) | 330 nm | — | 70.8 | 10.6 | 0.184 | 0.56 |
| C3 BG (6 mm)2/10 | — | — | — | 73.3 | 7.1 | 0.840 | 0.62 |
| C4 BG (6 mm)10/10 | — | — | — | 72.5 | 7.2 | 0.840 | 0.63 |
| C5 BG (6 mm) | SnO₂ (25 mm)/SiO₂ (25 mm) | 240 nm | — | 68.0 | 9.9 | 0.214 | 0.53 |
| Comparative Predictive Ex. | | | | | | | |
| CP1 BG (6 mm) | SnO₂ (25 mm)/SiO₂ (25 mm) | 330 nm | — | 68.2 | 10.6 | 0.184 | 0.53 |
| CP2 BG (6 mm) | SnO₂ (25 mm)/SiO₂ (25 mm) | 240 nm | — | 69.3 | 10.6 | 0.220 | 0.55 |
| Examples | | | | | | | |
| E1 BG (6 mm) | SnO₂ (25 mm)/SiO₂ (25 mm) | 240 nm | 41 nm | 70.3 | 6.9 | 0.261 | 0.54 |

As can be seen from Table 1, for a 6 mm glass, only Example E1 meets the criteria of Automotive Standard SAE J 1796, as previously described herein. It appears that one can reasonably conclude that the relatively thin silica overcoat 20 provides the lowest film side reflectance (Rf) of any of the examples, which in turn increases Tvis above 70%, while maintaining SHGC at ≤0.55.

TABLE 2

| Glass tint/ Thickness | Color Suppression | SnO2:F | SiO2 | Tvis (%) | Rf (%) | Eh | SHGC |
|---|---|---|---|---|---|---|---|
| C4 BG (6 mm) | — | — | — | 72.5 | 7.2 | 0.840 | 0.63 |
| C5 BG (6 mm) | SnO$_2$ (25 mm)/ SiO$_2$ (25 mm) | 240 nm | — | 68.0 | 9.9 | 0.214 | 0.53 |
| E1 BG (6 mm) | SnO$_2$ (25 mm)/ SiO$_2$ (25 mm) | 240 nm | 41 nm | 70.3 | 6.9 | 0.261 | 0.54 |

The efficacy of the silica overcoat 20 can be even more clearly seen from the comparison of certain comparative examples and Example E1 according to the invention. Uncoated tinted glass C4 exhibits a Tvis>70% and a low film side reflectance, but a clearly unacceptably high SHGC.

Coated tinted glass C5 lacking the SiO2 overcoat exhibits a Tvis substantially below the >70% required by Standard SAE J 1796. Film side reflectance is also relatively high. Even though Eh and SHGC are quite good, this desired balance of properties is, once again, not achieved.

E1 is similar to C5, but advantageously has the SiO2 overcoat deposited over the doped tin oxide layer. By this addition, Tvis, Eh and SHGC are, unexpectedly, brought into the desired balance.

As previously noted, a float glass manufacturing installation may be utilized as a means for practicing the method of the invention. The float glass installation described herein is illustrative of such installations, and is not limiting to the invention.

The float glass installation more particularly comprises a canal section along which molten glass is delivered from a melting furnace, to a float bath section wherein a continuous glass ribbon or substrate is formed in accordance with the well-known float process. Temperatures in the float bath section are typically between 1050° F. (565° C.) and 1400° F. (750° C.). Preferably temperatures are between 1100° F. (600° C.) and 1200° F. (650° C.). The glass ribbon advances from the bath section through an adjacent annealing lehr and a cooling section. The continuous glass ribbon is preferably the substrate on which the thin films of the present invention are deposited. The float bath section includes: a bottom section within which a bath of molten tin is contained, a roof, opposite sidewalls and end walls. The roof, sidewalls and end walls together define an enclosure in which a non-oxidizing atmosphere is maintained to prevent oxidation of the molten tin.

In operation, the molten glass flows along the canal beneath a regulating tweel and downwardly onto the surface of the tin bath in controlled amounts. On the molten tin surface, the molten glass spreads laterally under the influence of gravity and surface tension, as well as certain mechanical influences, and it is advanced across the tin bath to form the glass ribbon. The glass ribbon is removed from the tin bath section over lift out rolls and is thereafter conveyed through the annealing lehr and the cooling section on aligned rolls. The deposition of the thin film of the invention preferably takes place in the float bath section, although it may be possible for deposition to take place further along the glass production line, for example, in the gap between the float bath and the annealing lehr, or in the annealing lehr.

A suitable non-oxidizing atmosphere, generally nitrogen or a mixture of nitrogen and hydrogen in which nitrogen predominates, is maintained in the float bath enclosure to prevent oxidation of the molten tin comprising the float bath.

The atmosphere gas is admitted through conduits operably coupled to a distribution manifold. The non-oxidizing gas is introduced at a rate sufficient to compensate for normal losses and maintain a slight positive pressure, on the order of about 0.001 to about 0.01 atmosphere above ambient atmospheric pressure, so as to prevent infiltration of outside atmosphere. For purposes of the present invention, the above-noted pressure range is considered to constitute normal atmospheric pressure. Heat for maintaining the desired temperature regime in the float bath and the enclosure is provided by radiant heaters within the enclosure. The atmosphere within the lehr is typically atmospheric air, as the cooling section is not enclosed and the glass ribbon is therefore open to the ambient atmosphere. Ambient air may be directed against the glass ribbon as by fans in the cooling section. Heaters may also be provided within the annealing lehr for causing the temperature of the glass ribbon to be gradually reduced in accordance with a predetermined regime as it is conveyed therethrough.

The float glass installation includes gaseous reactant distributors, preferably in the float bath section previously described. The desired precursor mixture for each coating is supplied to a predetermined gas distributor(s), which in turn direct the flow of gaseous precursor mixtures to the surface of the moving, heated glass substrate. The various precursor mixtures each react at or near the glass surface to form the desired coatings.

In accordance with the provisions of the patent statutes, the present invention has been described in what is considered to represent its preferred embodiment. However, it should be noted that the invention can be practiced otherwise than as specifically illustrated and described without departing from its spirit and scope.

What is claimed is:

1. A coated glass article comprising:
   a tinted glass substrate;
   a fluorine doped tin oxide coating deposited over the tinted glass substrate; and
   an overcoat consisting of silica deposited over and in contact with the fluorine doped tin oxide coating, the overcoat having a thickness between 30 nm and 50 nm;
   the coated glass article exhibiting a visible light transmittance >70% as measured by Illuminant A (10 degree observer), a solar heat gain coefficient ≤0.55 and a hemispherical emissivity <0.4.

2. The coated glass article defined in claim 1, wherein the tinted glass is green, blue, or blue-green in color, falling within the CIELAB color coordinate range of a*=−10.5 to −4 and b*=−6.5 to +4, as measured by Illuminant C.

3. The coated glass article defined in claim 2, wherein the tinted glass falls within the CIELAB color coordinate range a*=−8.8 to −5.5 and
b*=−3 to +2, as measured by Illuminant C.

4. The coated glass article defined in claim 1, wherein a color suppression coating is deposited between the tinted glass substrate and the fluorine doped tin oxide coating.

5. The coated glass article defined in claim 4, wherein the color suppression coating comprises: an undoped tin oxide coating having a thickness of 20 nm-30 nm deposited over the tinted glass substrate and a silica coating having a thickness of 20 nm-30 nm deposited over the undoped tin oxide coating.

6. The coated glass article defined in claim 4, wherein the fluorine doped tin oxide coating has a thickness less than 350 nm.

7. The coated glass article defined in claim 6, wherein the film side reflectance of the coated glass article is <7% as measured by Illuminant A (10 degree observer).

8. A method of depositing a multi-layer coating stack on a substrate to form a coated glass article comprising:
providing a moving, heated glass substrate supported on a bath of molten metal in a glass manufacturing process, at substantially atmospheric pressure, wherein the glass is a tinted glass;
depositing a fluorine doped tin oxide coating comprising a tin compound and a dopant over the heated glass substrate; and
depositing an overcoat consisting of silica over and in contact with the fluorine doped tin oxide coating, wherein the overcoat is deposited at a thickness between 30 nm and 50 nm, and wherein the coated tinted substrate exhibits a visible light transmittance >70% as measured by Illuminant A (10 degree observer), a solar heat gain coefficient ≤0.55 and a hemispherical emissivity <0.4.

9. The method defined in claim 8, wherein a color suppression coating comprising one or more of a tin compound and a silica compound is deposited over the tinted glass substrate and prior to the deposition of the fluorine doped tin oxide coating.

10. The method defined in claim 8, wherein the tinted glass is green, blue, or blue-green in color, falling within the CIELAB color coordinate range of a*=−10.5 to −4 and b*=−6.5 to =4, as measured by Illuminant C.

11. The method defined in claim 10, wherein the tinted glass falls within the CIELAB color coordinate range of a*=−8.8 to −5.5 and b*=−3 to +2 as measured by Illuminant C.

12. The method define in claim 9, wherein the color suppression coating comprises: an undoped tin oxide coating having a thickness of 20 nm-30 nm deposited over the tinted glass substrate and a silica coating having a thickness of 20 nm-30 nm deposited over the undoped tin oxide coating.

13. The method defined in claim 8, wherein the fluorine doped tin oxide coating is deposited at a thickness less than 350 nm.

14. The coated glass article defined in claim 1, wherein the tinted glass substrate has a thickness of at least 5 mm.

15. The coated glass article defined in claim 1, wherein the tinted glass substrate has a thickness of 5 to 6 mm.

* * * * *